United States Patent Office.

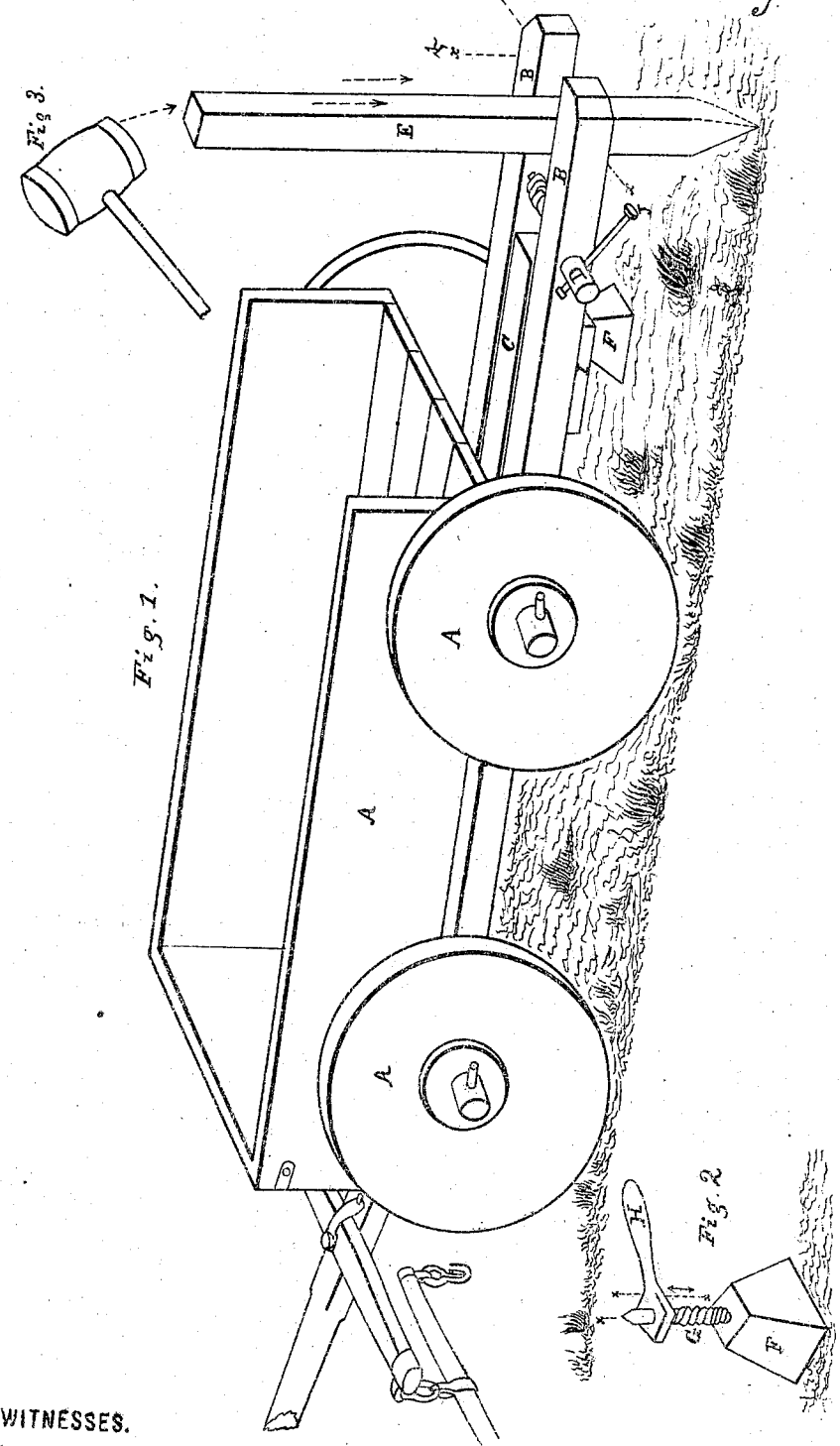

ALVIN B. CLARK, OF RICHMOND, INDIANA.

Letters Patent No. 80,600, dated August 4, 1868.

IMPROVED POST-DRIVER.

*The Schedule referred to in these Letters Patent and making part of the same.*

TO ALL WHOM IT MAY CONCERN:

Be it known that I, ALVIN B. CLARK, of Richmond, in the county of Wayne, and State of Indiana, have invented a new and useful Improvement in Apparatus for Driving or Setting Posts; and I do hereby declare the following is a full and exact description of the same, reference being had to the accompanying drawings, making a part of this specification, in which—

Figure 1 is a perspective view of a wagon and attachment.

Figure 2 is a screw-lever and base.

Figure 3 is a hand-beetle for driving.

The same letters in the different figures relate to corresponding parts of the invention.

My invention consists in driving or setting posts by the application of power from the force of gravity from the weight of a wagon or any vehicle drawn by horse-power, thrown upon the post by means of lever-clamps, screws, and hand-beetle.

To enable others skilled in the art to make and use my invention, I will proceed to describe its construction and operation.

Fig. 1. A A A represent a common wagon.

B B represent lever-clamps extending from the front axle-tree to the rear of said wagon.

C represents centre-beam or lever so connected with lever-clamps B B, at the front axle-tree, as to allow said lever-clamps B B proper motion for clamping-post. Said beam or lever C is attached to both axle-trees or parts of said wagon prepared for the same.

D represents screw passing through lever-clamps B B.

E represents post, with the lever-clamps B B attached to the same by screw D moved by lever J.

F represents base of hoisting-screw G, which is moved by its lever H.

I represents socket-plate firmly attached to centre-beam or lever C.

Fig. 2. F represents base of hoisting-screw G, which is moved by its lever H, and for convenience it may be detached, as shown in said figure.

The power for hoisting or raising said wagon is applied by screw G, moved by its lever H against plate I under centre-beam or lever C. Thus the rear end of wagon may be raised to proper height, when the lever-clamps B B are attached to said post by screw D, moved by its lever J. Then screw G is turned back to its lowest point, thus throwing the whole weight of the rear end of wagon and contents upon said post. After driving said post with hand-beetle, as shown in fig. 3, the raising of said wagon may be repeated, if necessary, until said post is settled to its proper depth.

Said apparatus may be detached from wagon any time, whenever the same is needed for other purposes.

Having thus fully described my said invention, what I claim, and desire to secure by Letters Patent, is—

1. The device, constructed substantially as described, and arranged upon a wagon in such a manner as to throw the weight of the vehicle upon the post, as and for the purpose set forth.

2. The combination of lever-clamps B B, centre-beam or lever C, screw D, with its lever J, hoisting-screw G with its base F, and lever H, socket-plate I, all operating substantially as described, and for the purpose set forth.

ALVIN B. CLARK.

Witnesses:
JOHN CALVERT,
SAMUEL BELLIS.